United States Patent

Ivester et al.

[11] B 4,000,500
[45] Dec. 28, 1976

[54] FILM CASSETTE LOADING DOOR LATCH AND INTERLOCK SWITCH FOR PHOTOGRAPHIC APPARATUS

[75] Inventors: Andrew S. Ivester, Charlestown; James J. Marchese, Saugus, both of Mass.

[73] Assignee: Polaroid Corporation, Cambridge, Mass.

[22] Filed: Aug. 30, 1974

[21] Appl. No.: 502,161

[44] Published under the second Trial Voluntary Protest Program on March 2, 1976 as document No. B 502,161.

[52] U.S. Cl. .............................. 354/174; 354/281; 354/83; 354/187
[51] Int. Cl.² .................. G03B 17/52; G03B 17/00
[58] Field of Search .......... 354/174, 187, 354, 275, 354/281, 288, 158, 83, 85, 86

[56] References Cited

UNITED STATES PATENTS

| | | | |
|---|---|---|---|
| 3,643,567 | 2/1972 | Douglas | 354/187 |
| 3,750,551 | 8/1973 | Land et al. | 354/83 R |
| 3,760,701 | 9/1973 | Paglia | 354/83 X |

*Primary Examiner*—Robert P. Greiner
*Attorney, Agent, or Firm*—Alfred E. Corrigan; Frank J. Caufield

[57] ABSTRACT

Photographic apparatus for use with a fully automatic camera adapted to sequentially expose and process a film supply in the form of a disposable cassette. Upon insertion of the cassette within a cassette receiving chamber formed in the base of the camera, a loading door assembly is closed to secure the cassette within the chamber, and as a function of the closure of the noted door assembly, a latch and switch function occur substantially simultaneously to lock the loading door and energize a photographic system electronic network which includes a sequence control function and various other subsystems responsive to sequence commands. The switch and latch are structured to provide an interlock function so that the system is inoperative if the loading door assembly is not in a closed position. A manually operative latch release button is provided to disengage the loading door from its locked position.

9 Claims, 6 Drawing Figures

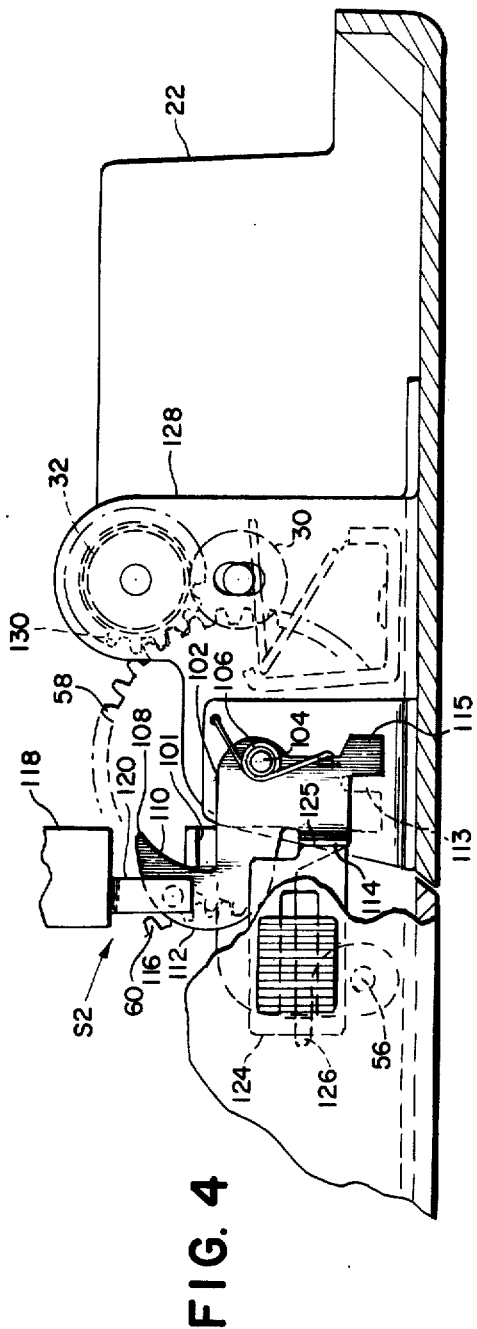
FIG. 4
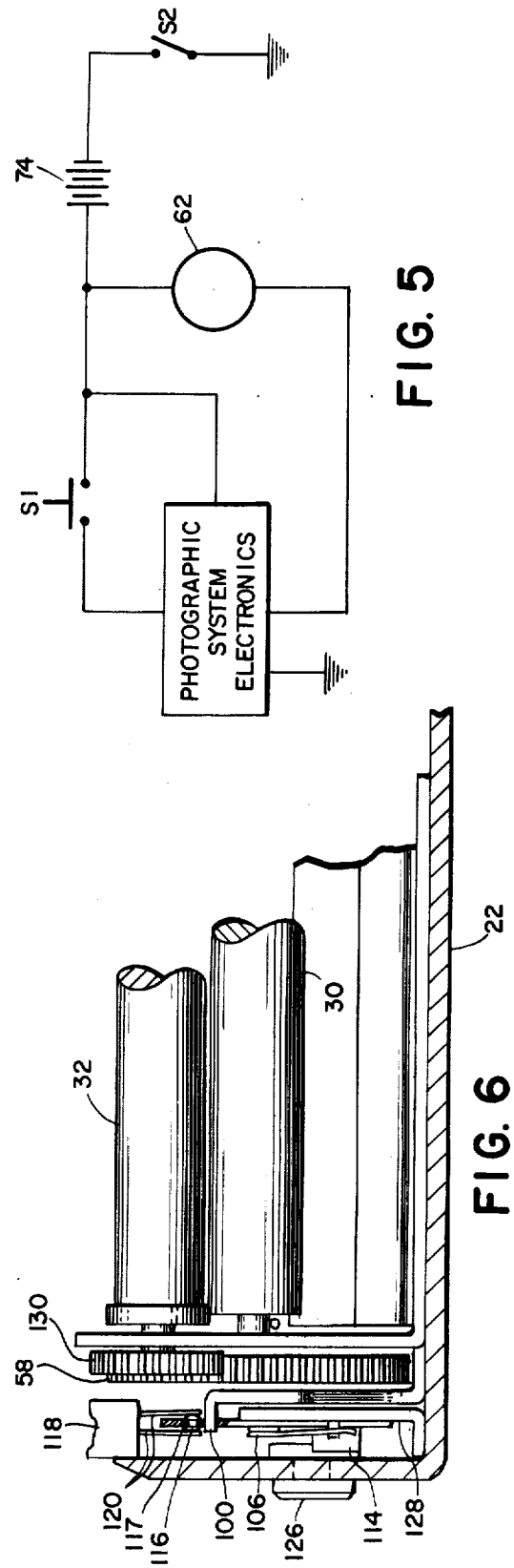
FIG. 5
FIG. 6

FILM CASSETTE LOADING DOOR LATCH AND INTERLOCK SWITCH FOR PHOTOGRAPHIC APPARATUS

BACKGROUND OF THE INVENTION

1. Field of the Invention

This invention relates to photographic apparatus and more particularly to a film cassette loading door latch and interlock switch for use with a fully automatic camera.

2. Description of the Prior Art

Convenience in the use, handling, and storage of amateur photographic systems is related to their size and the amount of operator effort involved in taking a picture and obtaining a finished print. A convenient photographic system, therefore, may be characterized as one comprising a compact camera and film combination requiring only nominal operator participation in the production of a finished print.

A great many photographic systems have been developed which approach the goal of convenience in a variety of ways. One such system, a self-developing type, is disclosed in the patent literature.

In U.S. Pat. No. 3,714,879 entitled "Reflex Camera" issued to Edwin H. Land, et al., on Feb. 6, 1973, is shown and described a fully automatic, single-lens reflex camera capable of being folded into a thin, compact shape suitable for convenient carrying in the pocket of a garment. This camera is intended to be used with a disposable film cassette including an integrated power supply. Such a cassette is described in considerable detail in, for example, U.S. Pat. Nos. 3,543,662 issued Dec. 1, 1970; 3,651,746, issued Mar. 28, 1972; and 3,705,542 issued Dec. 12, 1972. These latter patents describe photographic film assemblages each of which basically comprise a cassette, an opaque light shield or dark slide, and a plurality of film units, preferably of the self-developing type, arranged in stacked relation and adapted to be exposed and then automatically withdrawn from the cassette and processed in sequential fashion. The power supply, forming an integral part of the cassette, is a battery which supplies electrical energy for the operation of components of the camera in which the film units are exposed and processed. The camera includes various subsystems whose functions closely correspond to those steps a user would normally perform in a conventional photographic process. Such subsystems include, for example, the exposure control system, film-transport system, dark slide removal system, a motor-powered mechanism for processing an exposed film unit, and electronic logic circuits that provide a sequence control function.

The cassette is directly inserted into a receiving chamber formed by the base of the camera. The bottom of the chamber includes a pair of contacts adapted to engage the terminals of the battery of the cassette when it is disposed within the chamber and an upper portion which, in cooperation with the cassette structure, defines the exposure plane of the camera. After the cassette is inserted into the chamber, a pivotally mounted loading door is swung into a position where it blocks the receiving chamber entrance.

As a consequence of the nature of the cassette and the automated camera concept aimed at user convenience, it is desirable, as an adjunct to swinging the loading door into its blocking position, to have the dark slide automatically ejected so as to uncover a film unit and make it ready for exposure while at the same time have the loading door latched in a positive manner. An interlock function responsive to the latched door condition provided by a switch intermediate and in power supplying relation between the battery and other camera subsystems is also a highly desirable feature as it assures that all conditions for sequential operation are satisfied. Further, the latch must have the capability of being manually unlatchable to renew the cassette.

U.S. Pat. No. 3,760,701 entitled "Photographic Apparatus With Delayed Interlock Switch" issued to Richard Paglia on Sept. 25, 1973 discloses apparatus satisfying these requirements. The invention disclosed there may be characterized as a logical AND device in that the switch does not electrically couple the battery to the system circuity until two mechanical conditions are satisfied. Specifically, these conditions are that: (1) the door be in the closed position and (2) the latch be in its locked position. In accordance with the present invention it will be seen that all these requirements are still satisfied by the elimination of the logical AND nature of the switch described in the cited prior art and the replacement of it with a highly reliable simplified switch/latch mechanism that is binary in nature and uses fewer moving parts.

SUMMARY OF THE INVENTION

The present invention is addressed to a latching and switching feature for a fully automatic camera which provides a positive latch for a loading door assembly that secures film cassettes disposed within the camera and an interlock switch which couples a power source to the camera system electronic control and subsystems only if the loading door is securely latched in place. The interlock switch which is included as part of one of the latch members is thus a positional sensitive switch where its closed mode can occur only when the front door assembly reaches a position which automatically assures that the various subsystems of the camera are operatively associated with each other.

The latch includes a first stationary member located externally near an entrance to a film cassette receiving chamber of the camera and a second multi-cam surfaced rotating member pivotally mounted to the loading door assembly. As the loading door assembly is moved from a first cassette loading position to a second closed position, the second latch member contacts the first member in such a way that energy is stored in a torsion spring associated with the second latch member until a clearance position is reached relative to the two latch members where the energy is released, causing the second latch member to abruptly lock the loading door assembly securely in a closed position. Because part of the interlock switch is mounted with the second latch member it travels to a position corresponding to the locked latch position where it contacts its counterpart conducting member which is also rigidly mounted near the first latch member. Disengagement of the latch members is caused by the manual operation of a slidable button mounted in a wall of the cassette receiving chamber which, when actuated, causes, the second latch member to rotate out of contact with the first.

An object of the invention therefore is to provide a simplified highly reliable latch and switch arrangement having an interlock function.

Other objects of the invention will in part be obvious and will in part appear hereinafter.

For a fuller understanding of the nature and objects of the invention, reference should be had to the following detailed description taken in connection with the following drawings.

BRIEF DESCRIPTION OF THE DRAWINGS

The novel features that are considered characteristic of the invention are set forth with particularity in the appended claims. The invention itself, however, both as to its organization and its method of operation, together with additional objects and advantages thereof, will best be understood from the following description when read in connection with the accompanying drawings wherein like numbers have been employed in the different figures to denote the same parts and wherein:

FIG. 4 is an enlarged fragmented side elevational view, with parts broken away, of the camera of FIG. 1 illustrating the instant invention as it appears when the loading door is latched in its closed position;

FIG. 5 is a schematic drawing of an electronic system which may be incorporated with the camera of FIG. 1; and FIG. 6 is a sectional front elevational view of the instant invention and a processing system which may be incorporated in the camera of FIG. 1.

DESCRIPTION OF THE PREFERRED EMBODIMENT

Figure 1:
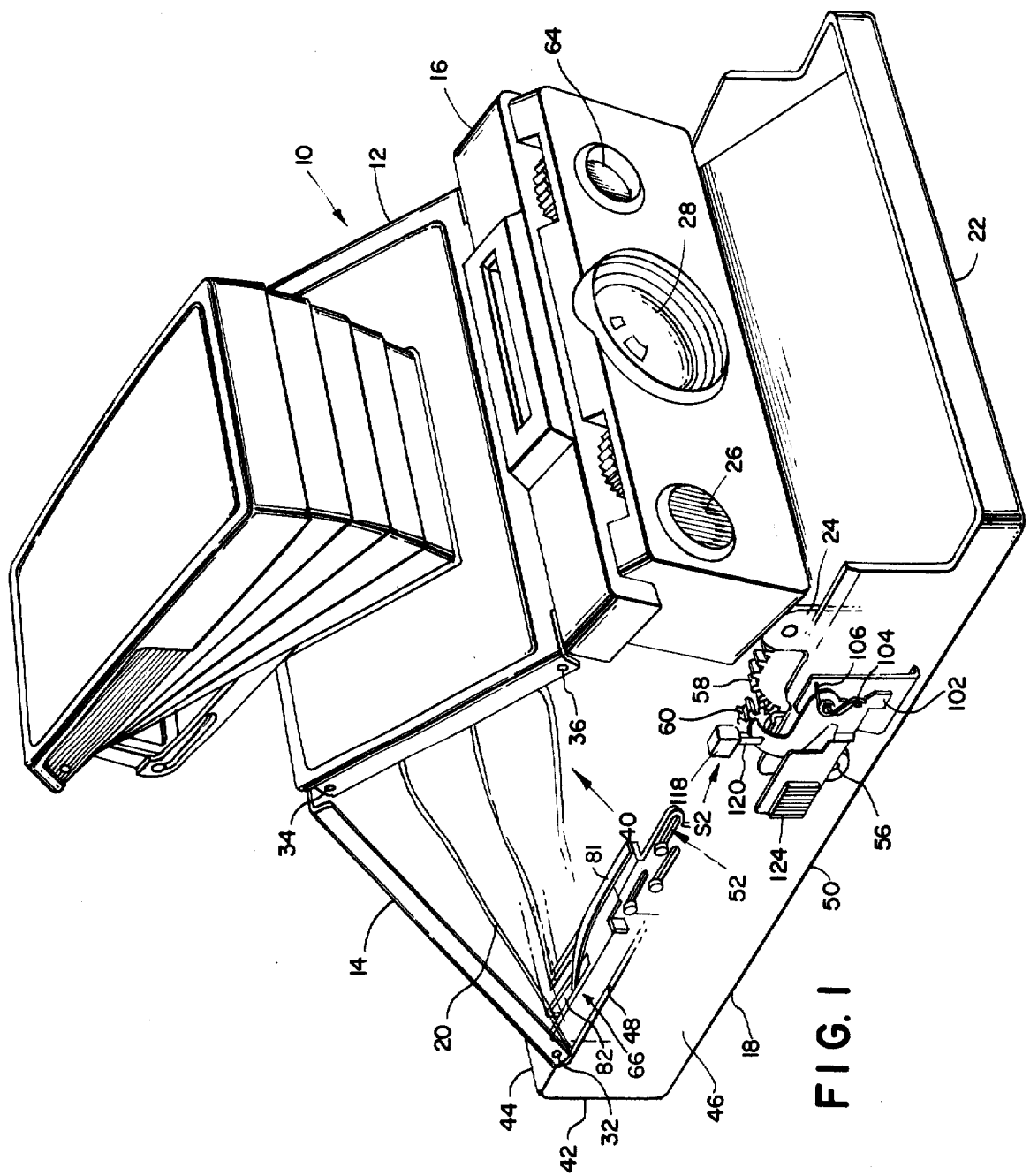
FIG. 1 is a pictoral representation of a camera embodying the latch and switching features of the instant invention with portions broken away to reveal internal structure.

Although the instant invention may be practiced with any camera admitting of its requirements, it is portrayed as being incorporated in a fully automatic camera designated as 10 in FIG. 1. This particular camera 10 is shown and more fully described in U.S. Pat. No. 3,714,879 entitled, "Reflex Camera" issued to Edwin H. Land, et al., on Feb. 6, 1973. Referring to FIG. 1, camera 10 is seen to include housing members 12 and 14 and shutter housing assembly 16 which are pivotally associated with base housing 18 so that camera 10 can be folded from its operative position as shown in FIG. 1 to a nonoperative compact condition (not shown) which makes it suitable for storage, handling, and transport as, for example, in the pocket of a garment. In folding camera 10 from its operative condition to its compact state housing members 12 and 14 and shutter housing assembly 16 are rotated about axes 32, 34 and 36 and an axis which is located at the rear of the base of shutter housing assembly 16.

Additionally, housing members 12 and 14 and shutter housing assembly 16 cooperate with bellows 20 to define a lighttight exposure chamber generally designated as 40.

Base housing 18 which is comprised of a rear wall 42, a pair of side walls 46 (only one shown), and a base 50 structurally cooperate to define a film cassette receiving chamber generally designated as 52. Within exposure chamber 40 is an exposure plane (not shown) but which is substantially defined by top edge 44 of rear wall 42 and top edges 48 of side walls 46.

Extending forwardly of base housing 18 and pivotally connected thereto at pivot 56 is a loading door assembly 22. Loading door assembly 22 includes a spread roll assembly 24 having a spur gear 58 which is adapted to engage a drive gear 60 which forms part of a gear train, not shown in full, but extending parallel to and adjacent side wall 46 and which is driven by a motor 62 (shown schematically in FIG. 5) located adjacent rear wall 42.

Shutter housing assembly 16 includes a lens assembly 28 which in cooperation with a mirror superimposed on the interior of housing member 14 defines a folded optical path that directs actinic radiation received through the lens assembly 28 to the exposure plane. Mounted integrally with shutter housing assembly 16 is a photographic cycle start switch 26 designated as S1 in FIG. 5 and a photometric assembly 64 which selects incident radiation from the scene of interest to provide electrical signals to an exposure control system shown and described in considerable detail in U.S. Pat. Nos. 3,762,299 entitled "Exposure Control Mechanism" issued to Lawrence M. Douglas on Oct. 2, 1973, and 3,791,278 entitled "Photographic Apparatus With Solenoid Powered Instrumentalities" issued to Conrad H. Biber and Edwin K. Shenk on Feb. 12, 1974.

Figure 2:
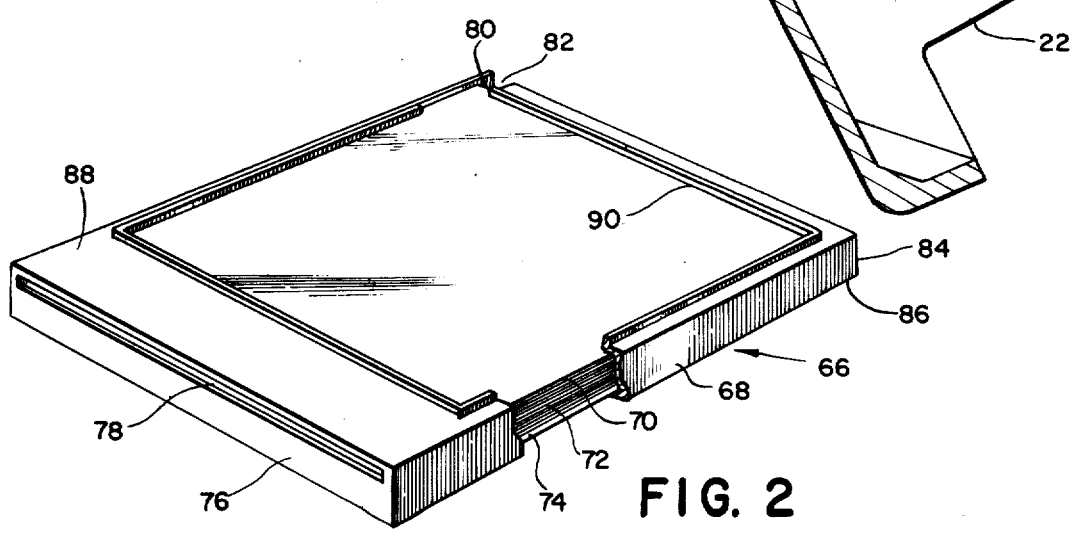
FIG. 2 is a diagrammatic perspective view with parts broken away of a film cassette utilized with the camera of FIG. 1.

Reference is now made to FIG. 2 wherein is shown a film cassette 66 of the type generally used with camera 10. Cassette 66 comprises a box-like housing 68 in which are arranged in stacked relationship a dark slide 70 which provides a temporary light seal, a plurality of photosensitive self-developing film units 72, a platen (not shown) four uring the film units into position for exposure and a flat thin battery 74. At a front wall 76 of housing 68 is located an exit slot 78 through which the aforementioned sheet-like members, i.e., dark slide 70 and film units 72, are adapted to be advanced. Advancement of the sheet members through slot 78 is caused by a film advance mechanism which may be of the type shown in detail in U.S. Pat. No. 3,753,392 entitled "Film Advancing Apparatus." Briefly a pick member 81 engages a trailing edge 80 of the forwardmost sheet-member through slot 82 in rear wall 84 of housing 68 and provides a pushing force against edge 80 toward exit slot 78.

When cassette 66 is inserted into cassette receiving chamber 52, the terminals of battery 74 contact a pair of battery contacts disposed in the bottom of chamber 52 that are adapted to enter through two spaced apart access holes located in bottom wall 86 of housing 68. A full description of this interface is disclosed in U.S. Pat. No. 3,705,537 entitled "Apparatus for Interfacing Photographic Camera and Film Cartridge" issued to Richard Paglia on Dec. 12, 1972. Housing 68 also has portions in front wall 88 defining an exposure aperture 90 which is coincident with exposure plane 54 when cassette 66 is disposed in receiving chamber 52.

Figure 3:
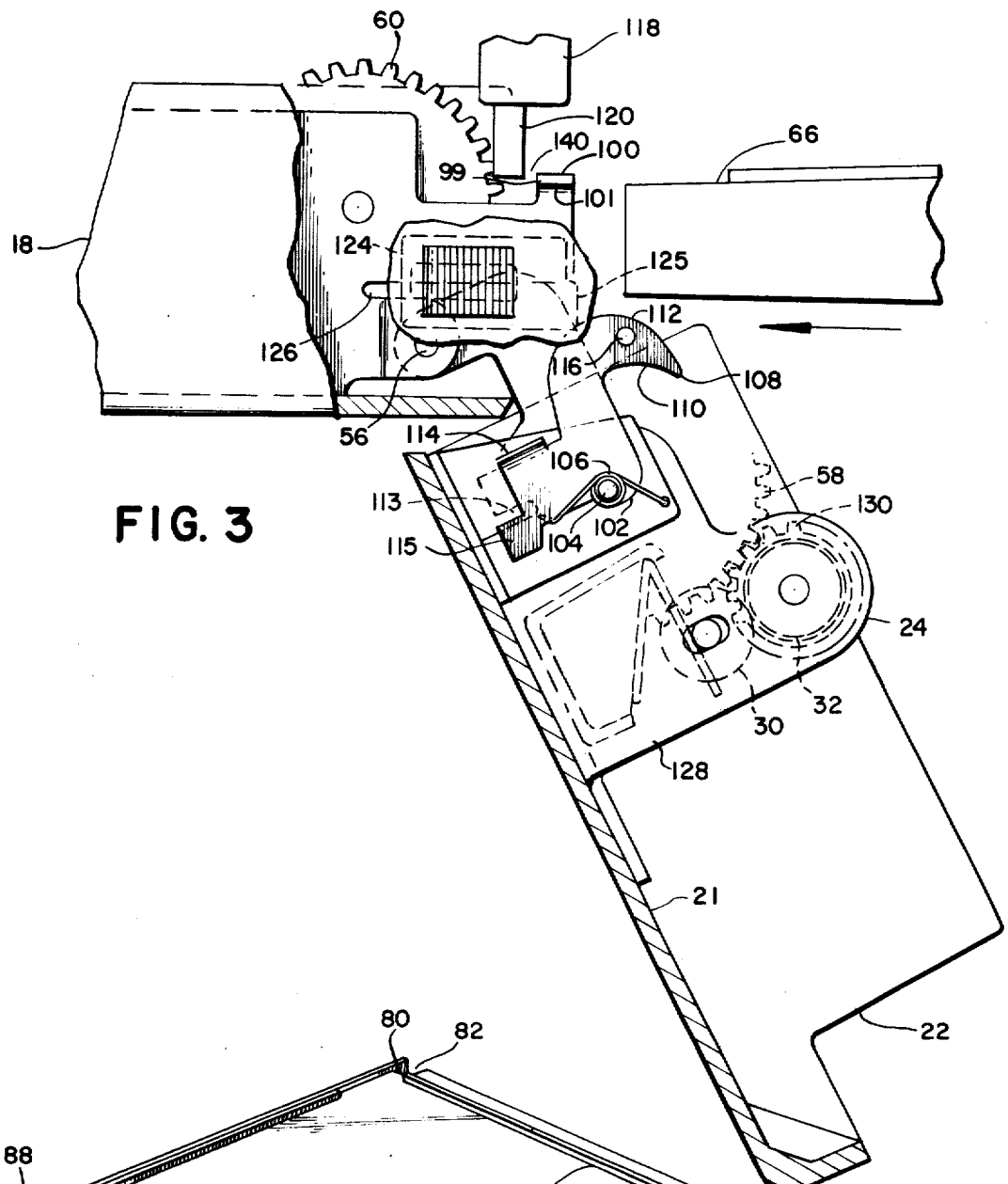
FIG. 3 is an enlarged fragmented side elevational view, with parts broken away, of the camera of FIG. 1 illustrating the instant invention as it appears when the film cassette of FIG. 2 is being inserted into the camera film receiving chamber.

In order to more fully appreciate the nature of the instant invention a generalized discussion of the operation of camera 10 will briefly be set forth by reference to FIGS. 3, 4 and 5 and other relevant U.S. patents. FIG. 3 shows loading door assembly 22 in a first open position. While in this position cassette 66 is inserted into receiving chamber 52 through entrance 140. When disposed within receiving chamber 52, battery 74 of cassette 66 is electrically coupled in energy supplying relationship with various subsystems of camera 10 as shown schematically in FIG. 5. Switch S2 of FIG.

5 which is comprised of a pair of conducting members 120 and 116 of FIG. 3 is normally open as cassette 66 is being inserted into camera 10.

When loading door assembly 22 is pivoted about pivot 56 toward a second closed position as illustrated in FIG. 4, it is latched in locking relationship to base housing 18 as a result of latching members 102 and 100 coming into engagement. When in this second position several events occur simultaneously. First, switch S2 closes thereby supplying power to the camera motor 62 and photographic system electronics as shown in FIG. 5. Second, gears 58 and 60 become engaged. Third, a pair of rollers 30 and 32, which form part of spread roller assembly 24, block entrance 140 to receiving chamber 52 and secure cassette 66 within the chamber while at the same time become located to engage sheet members advanced between them. As a consequence of switch S2 being closed, power is supplied to a variety of subsystems in camera 10 which are regulated by sequence commands sent out in the form of logic signals from a system control described in detail in U.S. Pat. No. 3,744,385 entitled "Control System for Photographic Apparatus." The various subsystems referred to are described in aforementioned U.S. Pat. Nos. 3,762,229; 3,791,278; 3,753,392; and in addition, for example, U.S. Pat. Nos. 3,750,543 entitled "Focus Responsive Exposure Control System"; 3,750,551 entitled "Photographic Apparatus and System With Automatic Film Cover Ejection"; and 3,371,608 entitled "Reflex Camera With Motor Drive."

Under the command from the sequence control logic the dark slide 70 is automatically ejected by being advanced through exit slot 78 of cassette 66 and into engagement between rollers 30 and 32 which are rotated as a result of being driven by gear 130, mounted on roller 32, which is in engagement with and driven by gear 58. After dark slide 70 has been ejected photosensitive film units 72 are individually exposed in sequence in response to the operator depressing start button 26, designated schematically as switch S1 in FIG. 5. After all the film units are expended, the operator manually disengages loading door assembly 22 by pushing unlatch button 124 to release latching members 100 and 102 from locking relationship thereby permitting the removal of the now empty film cassette 66. Upon the removal of cassette 66 the photographic system electronics is reset to start the sequence anew.

In view of the foregoing generalized description of the operation of camera 10 and the complexity of the associated sequence control and subsystems, it is important to recognize the criticality of the latch and switch interlock function within the context of operator convenience and reliability of operation. In particular, when loading door assembly is in its second closed position proper operation of the system will take place only if simultaneously switch S2 is closed, gears 58 and 60 are in mesh, and loading door assembly is in locked relationship with base housing 18.

A more detailed description of the instant invention demonstrating its mode of operation and certain features related to its reliability will now be given. Referring again to FIG. 3, a multi-cam surfaced latch member 102 is pivotally mounted for rotation about pivot 104.

Pivot 104 is mounted within a rigid frame 128 which is fixedly attached to a bottom wall 21 of loading door assembly 22. A torsion spring 106 provides a resilient clockwise biasing torque to member 102 about its axis of rotation, pivot 104. Member 102 is prevented from further clockwise rotation as shown because it has a tab section 115 which butts against a blocking section 113 of frame 128. Additional features of member 102 include a convex cam surface 112 and a concave cam surface 110 which converge to a tip 108 to form a crescent-shaped upper section, the function of which will be elaborated on hereinafter. Located intermediate the curved cam sections 110 and 112 and extending through the thickness of member 102 is a conducting button 116 which is electrically insulated from member 102 by a suitable insulator 117. This button 116 forms part of the S2 switch. The other conducting member of switch S2 includes a plastic block 118 in which is mounted a pair of spaced-apart conducting leaves 120 which are preloaded toward each other in block 118. When button 116 is inserted between leaves 120, switch S2 is closed. This particular switch design has the advantage of high contact forces with small displacements of leaves 120 because of the preload feature. In addition, the contacting surfaces forming switch S2 are kept in a clean condition because of the wiping action between the conducting members. Block 118 is rigidly mounted on base housing 18 so as to be positioned to define a predetermined point of contact which corresponds to switch S2 being closed only when latch member 102 is in locking relationship with latch member 100 as shown in FIG. 4.

Latch member 102 additionally includes another cam surface 114 which is adapted to engage a leading edge 125 of the unlatch button 124 as loading door assembly 22 is rotated from its first open position shown in FIG. 3 to its second closed position shown in FIG. 4. The second latch member 100 is a bent over tab formed within side wall 46 of base housing 18 and is located adjacent entrance 140 of cassette receiving chamber 52. The unlatch button 124 is slidably mounted in a slot 126 formed inside wall 46 for movement between a first inoperative position shown in FIG. 4 to a second unlatching position shown in FIG. 3.

As to the operation of the invention, the system user rotates loading door assembly 22 toward its second closed position. As the rotation occurs, cam surface 112 contacts latch member 100, and the applied force combined with the pressure angles of cam surface 112 causes latch member 102 to rotate in a counterclockwise manner (as shown in FIG. 3).

Continued rotation of door assembly 22 stores additional energy in torsion spring 106 as the tip 108 of member 102 slides along a bottom surface 101 of latch member 100 until tip 108 clears an edge 99 of member 100. Upon clearing edge 99, the stored energy in spring 106 acting in cooperation with a dwell portion designed into concave cam surface 110 allows the energy to be released causing member 102 to rotate in its biased direction such that a non-dwell section of surface 110 abruptly contacts edge 99 and causes a positive lock between door assembly 22 and housing 18. The point where the locking takes place occurs when door assembly 22 is in its second closed position. As a result of the rapid energy release, switch S2 is made to contact shortly after the closed position of door assembly 22 has been reached. Therefore, the three conditions for system operation are satisfied at substantially the same moment and can occur only when door assembly 22 is in its second position. To unlock the door assembly 22, the operator simply pushes button 124 thereby causing latch member 102 to rotate out of engagement and with sufficient clearance so that door assembly 22 can be rotated back to its open position. It is to be noted that regardless of the position of unlatch button 124 prior to the closing of door assembly 22, it will always be moved into its first inoperative position as a result of its being moved by the contact between its edge 125 and tab 115 of latch member 102. Therefore, the entire invention can be characterized as a binary function in that all system operating conditions are satisfied, if only one is satisfied, i.e., door assembly 22 is in its second position.

Another aspect of the invention relating to a latch failure mode sometimes troublesome in prior art inventions is worth noting. When in the locked position there is a built-in threshold torque which, if exceeded by an inadvertently applied torque to door assembly 22 in an attempt to open the door without actuating button 124, will allow the system to become unlatched without failing any of its parts as was experienced occasionally on some of the prior art inventions.

It is believed from the foregoing disclosure that those familiar with the art will recognize that a simplified, highly reliable solution has been provided by the instant invention as a result of incorporating all its necessary functions into fewer parts in a more reliable fashion.

What is claimed is:

1. Photographic apparatus for use with a cassette of the type including a plurality of sheet members which include an opaque light seal and a plurality of photosensitive film units that are adapted to be sequentially exposed and processed, said apparatus comprising:
    a first housing member defining a chamber configured to receive the cassette;
    access means in said first housing member defining an opening therein through which the cassette may be inserted or removed;
    sequence control means for providing sequencing commands to a drive means, said control means being powered by an electrical energy source;
    a second housing member movably connected to said first housing member for movement between a first open position unblocking said access means to said chamber thereby permitting a cassette to be inserted into or removed from said chamber and a second closed position which blocks said access means and thereby secures a cassette disposed within said chamber, said second housing member further including thereon a pair of rotatably mounted juxtaposed rollers adapted to receive and advance therebetween a film unit brought into operative relationship therewith by a drive means and a gear mounted on at least one of said rollers for imparting rotatory motion thereto, said gear adapted to be coupled with the drive means when said second housing member is in its second closed position;
    means for pivotally connecting said second housing member to said first housing member so as to permit the movement of said second housing member between its first open position and its second closed position;
    drive means for removing one of the sheet members from the cassette, said drive means being actuable in response to commands from said sequence control means and powered by the electrical energy source, said drive means further including:
        an electric motor energizable on command from said sequence control means;
        gear means coupled to said electric motor for driving said gear on one of said rollers when brought into engagement therewith; and
        means powered by said electric motor for selectively engaging individual ones of the sheet members of the cassette to advance such sheet member from the cassette into operative relationship with said pair of rollers so that such sheet member is received between said rollers;
    exposure means for selectively exposing photosensitive ones of the film units of the cassette, said exposure means being actuable in response to commands from said sequence control means upon completion of a conductive path by a switch;
    latch means including first and second latch members, said first latch member being connected to said first housing member, said second latch member being connected to said second housing member, said first and second latch members being brought into engagement as said second housing member is moved from said first position to said second position, said latch means securing said second housing member to said first housing member in locked relationship when said second housing member reaches said second position, said first latch member including a tab rigidly attached to said first housing member and adapted to engage said second latch member, and wherein said second latch member is a multicam surfaced member pivotally mounted to said second housing member for relative rotatory motion with respect thereto;
    means for disengaging said first and said second latch member from said locked relationship thereby permitting relative movement between said first and said second housing members, said disengaging means being mounted for movement between a first inoperative position to a second unlatching position such that whenever said second housing member is in its second closed position said disengaging means is in its first inoperative position; and
    a circuit for providing a conductive path from the electrical energy source to said sequence control means and said drive means, said conductive path being selectively interruptable by a switch coupled intermediate the electrical energy source and in energy supplying relationship with said sequence control means and said drive means, said circuit including a switch having at least two conductive members, one of said conductive members being movable in correspondence with the movement of said second housing member towards a predetermined point of contact with the other conductive member to complete said conductive circuit path from the electrical energy source to said sequence control means and said drive means, said predetermined point of contact being closely proximate with said second housing member being in its second position so as to provide an interlock function for said photographic apparatus.

2. The apparatus of claim 1 additionally including means for resiliently biasing said second latch member about its pivotal connection to said second housing member, the influence of said biasing means being in a direction opposite to the direction of rotation of said second housing member from its first open position to its second closed position.

3. The apparatus of claim 2 wherein said multicam surfaced member includes a crescent-shaped upper section the convex side of which, when brought into contact with said first latch member, causes said second latch member to rotate through a predetermined path so as to store energy in said resilient biasing means and bring the tip of said crescent-shaped section to a position with respect to said first latch member which permits the release of said stored energy to impart motion to said second latch member such that the concave side of said crescent-shaped section engages said first latch member in locking relationship.

4. The apparatus of claim 3 wherein said multicam surfaced plate additionally includes an extended tab section which, as said second housing section is moved into its said second position, contacts said disengaging means and moves it into its first inoperative position thereby assuring that said disengaging means is always out of its said second unlatching position whenever said second housing member is in its said second closed position.

5. The apparatus of claim 4 wherein said switch includes a first conductive member rigidly attached to said first housing member and a second conductive member rigidly attached to said second latch member.

6. The apparatus of claim 5 wherein said disengaging means includes a block slideably mounted on said first housing member such that it is manually actuable from its said first inoperative position, manual actuation thereof causing it to move into contact with said extended tab section of said second latch member so as to cause said second latch member to rotate out of locking engagement with said first latch member.

7. The apparatus of claim 6 further including exposure means for selectively exposing photosensitive ones of the film units of the cassette, said exposure means being actuable in response to commands from said sequence control means upon the completion of said conductive path by said switch means.

8. Photographic apparatus for use with a cassette of the type including a plurality of sheet members which include an opaque light seal and a plurality of photosensitive film units that are adapted to be sequentially exposed and processed, said apparatus comprising:
 a first housing member defining a chamber configured to receive the cassette;
 access means in said first housing member defining an opening therein through which the cassette may be inserted or removed;
 sequence control means for providing sequencing commands to a drive means, said control means being powered by an electrical energy source;
 drive means for removing one of the sheet members from the cassette, said drive means being actuable in response to commands from said sequence control means and powered by the electrical energy source;
 a second housing member movably connected to said first housing member for movement between a first open position unblocking said access means to said chamber thereby permitting a cassette to be inserted into or removed from said chamber and a second closed position which blocks said access means and thereby secures a cassette disposed within said chamber;
 latch means including first and second latch members, said first latch member including a tab rigidly attached to said first housing member and adapted to engage said second latch member, said second latch member being a multi-cam surfaced member pivotally mounted to said second housing member for relative rotatory motion with respect thereto, said first and second latch members being brought into engagement as said second housing is moved from said first position to said second position, said latch means securing said second housing member to said first housing member in locked relationship when said second housing member reaches said second position;
 means for disengaging said first and said second latch members from said locked relationship thereby permitting relative movement between said first and said second housing members, said disengaging means being mounted for movement between a first inoperative position to a second unlatching position such that whenever said second housing member is in its second closed position said disengaging means is in its first inoperative position; and
 a circuit for providing a conductive path from the electrical energy source to said sequence control means and said drive means, said conductive path being selectively interruptible by a switch coupled intermediate the electrical energy source and in energy supplying relationship with said sequence control means and said drive means, said circuit including a switch having at least two conductive members, one of said conductive members being mounted in said second housing member for movement in conjunction therewith towards a predetermined point of contact with the other conductive member to complete said conductive circuit path from the electrical energy source to said sequence control means and said drive means, said predetermined point of contact being closely proximate with said second housing member being in its second position so as to provide an interlock function for said photographic apparatus.

9. Photographic apparatus for use with a cassette of the type including a plurality of sheet members which include an opaque light seal and a plurality of photosensitive film units that are adapted to be sequentially exposed and processed, said apparatus comprising:
 a first housing member defining a chamber configured to receive the cassette;
 access means in said first housing member defining an opening therein through which the cassette may be inserted or removed;
 sequence control means for providing sequencing commands to a drive means, said control means being powered by an electrical energy source;
 drive means for removing one of the sheet members from the cassette, said drive means being actuable in response to commands from said sequence control means and powered by the electrical energy source;
 a second housing member movably connected to said first housing member for movement between a first open position unblocking said access means to said chamber thereby permitting a cassette to be inserted into or removed from said chamber and a second closed position which blocks said access means and thereby secures a cassette disposed within said chamber;
 latch means including first and second latch members, said first latch member being connected to said first housing member, said second latch member being connected to said second housing member, said first and second latch members being brought into engagement as said second housing member is moved from said first position to said second position, said latch means securing said second housing member to said first housing member in locked relationship when said second housing member reaches said second position;

means for disengaging said first and said second latch members from said locked relationship thereby permitting relative movement between said first and said second housing members, said disengaging means being mounted for movement between a first inoperative position to a second unlatching position such that whenever said second housing member is in its second closed position said disengaging means is in its first inoperative position; and a circuit for providing a conductive path from the electrical energy source to said sequence control means and said drive means, said conductive path being selectively interruptable by a switch coupled intermediate the electrical energy source and in energy supplying relationship with said sequence control means and said drive means, said circuit including a switch having at least two conductive members including a first conductive member rigidly attached to said first housing member and a second conductive member being mounted in said second housing member for movement in conjunction therewith towards a predetermined point of contact with the other conductive member to complete said conductive circuit path from the electrical energy source to said sequence control means and said drive means, said second conductive member being rigidly attached to said second latch member, said predetermined point of contact being closely proximate with said second housing member being in its second position so as to provide an interlock function for said photographic apparatus.

* * * * *